US012501521B2

(12) United States Patent
Suzuki et al.

(10) Patent No.: US 12,501,521 B2
(45) Date of Patent: Dec. 16, 2025

(54) HEATER DEVICE

(71) Applicant: DENSO CORPORATION, Kariya (JP)

(72) Inventors: Yuuya Suzuki, Kariya (JP); Yuusuke Tanaka, Kariya (JP); Takuya Igashira, Kariya (JP)

(73) Assignee: DENSO CORPORATION, Kariya (JP)

( * ) Notice: Subject to any disclaimer, the term of this patent is extended or adjusted under 35 U.S.C. 154(b) by 689 days.

(21) Appl. No.: 17/965,067

(22) Filed: Oct. 13, 2022

(65) Prior Publication Data

US 2023/0031830 A1 Feb. 2, 2023

Related U.S. Application Data

(63) Continuation of application No. PCT/JP2021/015724, filed on Apr. 16, 2021.

(30) Foreign Application Priority Data

Apr. 17, 2020 (JP) ................................ 2020-074419
Mar. 26, 2021 (JP) ................................ 2021-053511

(51) Int. Cl.
*H05B 3/26* (2006.01)
*B60H 1/00* (2006.01)
*B60H 1/22* (2006.01)

(52) U.S. Cl.
CPC .......... *H05B 3/26* (2013.01); *B60H 1/00295* (2019.05); *H05B 3/267* (2013.01); *B60H 1/2226* (2019.05);
(Continued)

(58) Field of Classification Search
CPC .... H05B 3/26; H05B 3/267; H05B 2203/003; H05B 2203/013; H05B 2203/022; H05B 2203/032; B60H 1/00295; B60H 1/2226
See application file for complete search history.

(56) References Cited

U.S. PATENT DOCUMENTS

2015/0110477 A1 4/2015 Ota et al.
2016/0039265 A1 2/2016 Ota et al.
(Continued)

FOREIGN PATENT DOCUMENTS

JP 2014003000 A 1/2014
JP 2014190674 A 10/2014
(Continued)

OTHER PUBLICATIONS

U.S. Appl. No. 18/446,097, filed Aug. 8, 2023, Tanaka et al.
U.S. Appl. No. 18/446,191, filed Aug. 8, 2023, Igashira et al.

*Primary Examiner* — Elizabeth M Kerr
*Assistant Examiner* — Keith Brian Assante
(74) *Attorney, Agent, or Firm* — Harness, Dickey & Pierce, P.L.C.

(57) ABSTRACT

A heater device includes a heat generating portion formed so as to be adjacent to one surface of an insulating substrate and configured to generate heat, and a heat equalizing portion arranged between adjacent heat generating portions and configured to diffuse the heat of the heat generating portion. The heat generating portion has a linear shape, and at least one of a distance between one of the adjacent heat generating portions and the heat equalizing portion and a distance between the other of the adjacent heat generating portions and the heat equalizing portion is equal to or less than a line width of the heat generating portion. In the heat equalizing portion, a distance between one end of one of the adjacent heat generating portions and the other end of the other of the adjacent heat generating portions is longer than the line width of the heat generating portion.

13 Claims, 8 Drawing Sheets

(52) U.S. Cl.
CPC .. *H05B 2203/003* (2013.01); *H05B 2203/013* (2013.01); *H05B 2203/022* (2013.01); *H05B 2203/032* (2013.01)

(56) References Cited

U.S. PATENT DOCUMENTS

2018/0208021 A1* 7/2018 Seki ................. B60H 1/00742
2018/0297449 A1* 10/2018 Oide ................. B60H 1/2226

FOREIGN PATENT DOCUMENTS

| JP | 2019169356 A | 10/2019 |
| JP | 2019184171 A | 10/2019 |

* cited by examiner

HEATER DEVICE

CROSS REFERENCE TO RELATED APPLICATIONS

This application is a continuation application of International Patent Application No. PCT/JP2021/015724 filed on Apr. 16, 2021, which designated the U.S. and based on and claims the benefits of priority of Japanese Patent Application No. 2020-074419 filed on Apr. 17, 2020 and Japanese Patent Application No. 2021-053511 filed on Mar. 26, 2021. The entire disclosure of all of the above applications is incorporated herein by reference.

TECHNICAL FIELD

The present disclosure relates to a heater device.

BACKGROUND

Conventionally, there is an electric heater device.

SUMMARY

The present disclosure is to provide the heater device for further homogenizing a temperature distribution.

According to one viewpoint of the present disclosure, a heater device includes a heat generating portion formed so as to be adjacent to one surface of an insulating substrate and configured to generate heat by energization, and a heat equalizing portion arranged between the adjacent heat generating portions and configured to diffuse the heat of the heat generating portion in a surface direction of one surface. Further, the heat generating portion has a linear shape, and at least one of the distance between one of adjacent heat generating portions and the heat equalizing portion and the distance between the other of adjacent heat generating portions and the heat equalizing portion is equal to or less than the line width of the heat generating portion. Further, in the heat equalizing portion, the distance between one end of one of the adjacent heat generating portions and the other end of the other of the adjacent heat generating portions is longer than the line width of the heat generating portion.

DETAILED DESCRIPTION

Figure 1:
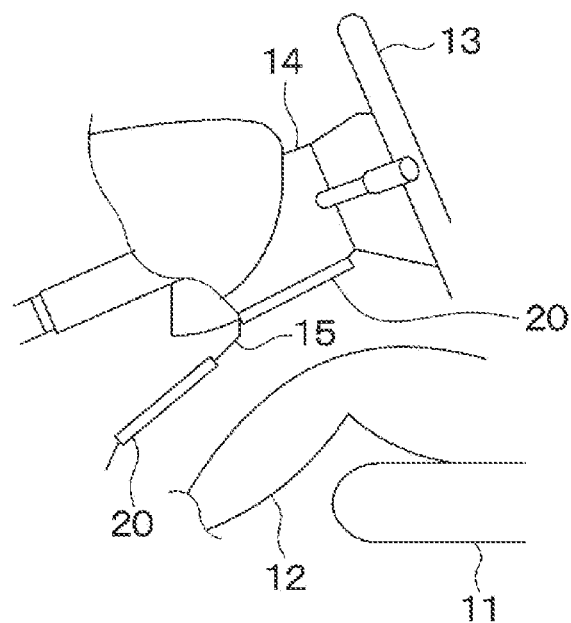
FIG. 1 is a diagram showing a mounting position of a heater device according to a first embodiment.

In an assumable example, there is an electric heater device. In this device, a heat generating portion that generates heat by energization, and a transmitting electrode and a receiving electrode that form an electric field for detecting contact or proximity of an object are formed on one surface side of an insulating substrate. This device has a detection circuit that detects a contact or proximity of an object based on the change in the electric field formed by each electrode. In this device, the transmitting electrode and the receiving electrode diffuse the heat generated by the heat generating portion in a plane direction, enabling uniform temperature distribution.

In the device described above, the transmitting electrode and the receiving electrode receive the heat of the heat generating portion and diffuse in the plane direction to improve the surface temperature distribution. However, according to a study of the discloser, in this device, there is a problem that the temperature distribution becomes uneven because a density difference of each wiring of the heat generating portion, the transmitting electrode and the receiving electrode is large. The present disclosure is to provide the heater device for further homogenizing the temperature distribution.

According to one viewpoint of the present disclosure, a heater device includes a heat generating portion formed so as to be adjacent to one surface of an insulating substrate and configured to generate heat by energization, and a heat equalizing portion arranged between the adjacent heat generating portions and configured to diffuse the heat of the heat generating portion in a surface direction of one surface. Further, the heat generating portion has a linear shape, and at least one of the distance d1 between one of adjacent heat generating portions and the heat equalizing portion and the distance between the other of adjacent heat generating portions and the heat equalizing portion is equal to or less than the line width of the heat generating portion. Further, in the heat equalizing portion, the distance between one end of one of the adjacent heat generating portions and the other end of the other of the adjacent heat generating portions is longer than the line width of the heat generating portion.

According to the above configuration, at least one of the distance between one of the adjacent heat generating portions and the heat equalizing portion and the distance between the other of the adjacent heat generating portions and the heat equalizing portion is equal to or less than the line width of the heat generating portion. Therefore, it is possible to secure the heat transfer property from the heat generating portion to the heat equalizing portion. Further, in the heat equalizing portion, the distance between one end of one of the adjacent heat generating portions and the other end of the other of the adjacent heat generating portions is longer than the line width of the heat generating portion. Therefore, the heat of the heat generating portion can be transferred between the adjacent heat generating portions and efficiently dissipated. Therefore, the temperature distribution can be further made uniform.

Embodiments of the present disclosure will now be described with reference to the drawings. In the following embodiments, the same or equivalent parts are denoted by the same reference numerals as each other, and explanations will be provided to the same reference numerals.

First Embodiment

A heater device according to a first embodiment will be described with reference to FIGS. 1 to 6. As shown in FIG. 1, the heater device 20 is installed in an interior of a moving body such as a road traveling vehicle. The heater device 20 constitutes a part of the heating device for the interior. The heater device 20 is an electric heater that is supplied with a power from a power supply such as a battery and a generator mounted on the moving body to generate heat. The heater device 20 has a thin plate-shape. The heater device 20 generates heat when power is supplied.

Figure 2:
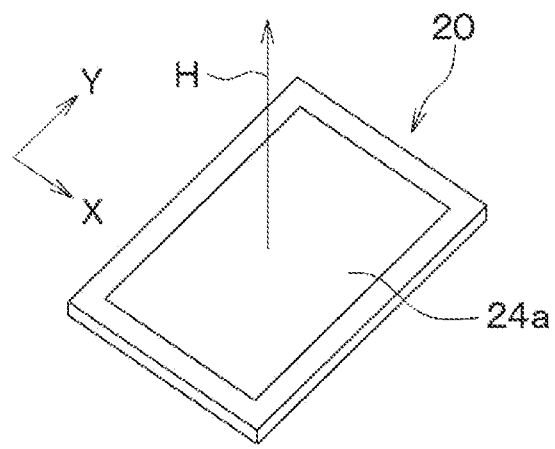
FIG. 2 is an external view of a heater device according to the first embodiment.

As shown in FIG. 2, the heater device 20 has a heat generating surface 24a that radiates a radiant heat H primarily in a direction perpendicular to a surface of the heater device 20 to warm a target object positioned in the direction perpendicular to the surface. It can be called a plan heater.

A seat 11 on which an occupant 12 is seated is installed in the interior. The heater device 20 is installed in the interior to radiate the radiant heat H to feet of the occupant 12. The heater device 20 can be used for quickly providing warmth to the occupant 12 immediately after activating other heater devices, for example. The heater device 20 is installed on a wall surface of the interior.

The heater device 20 is arranged to face the occupant 12 who is in an assumed normal posture. The road traveling vehicle has a steering column 14 for supporting a steering wheel 13. The heater device 20 is installed on a lower surface of the steering column 14 and a lower surface of an instrument panel cover 15 so as to face the occupant 12.

Figure 3:
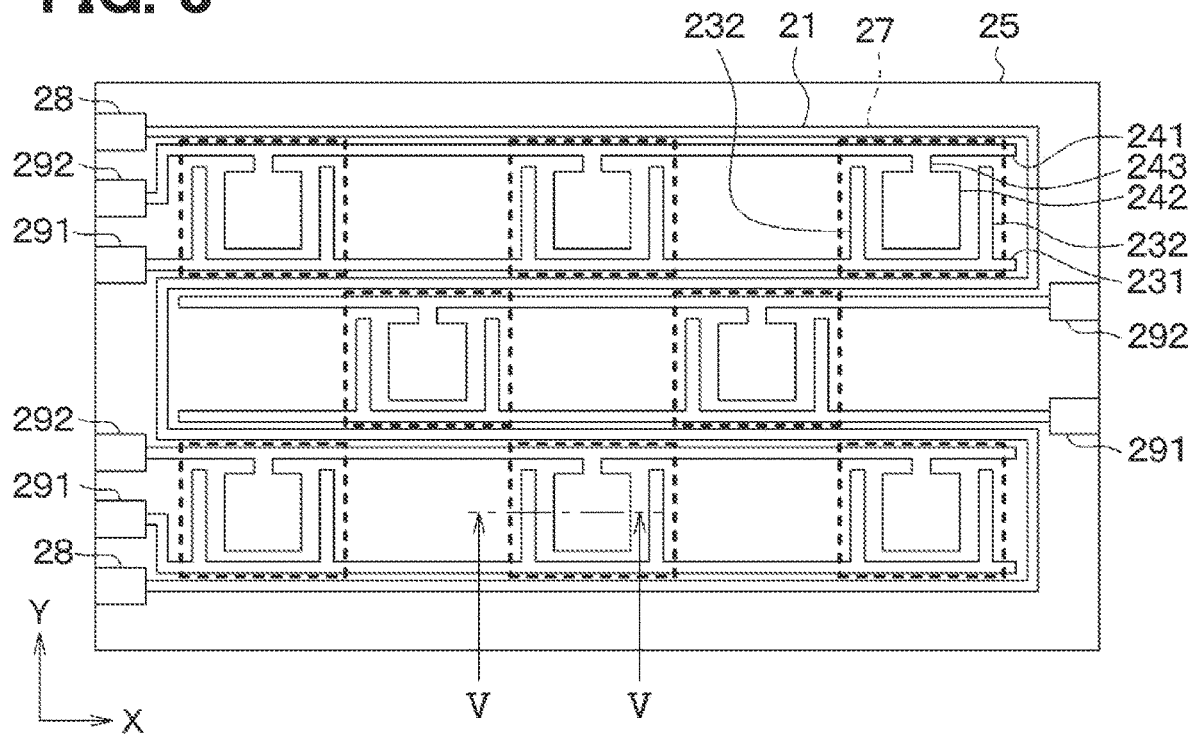
FIG. 3 is a front view of the heater device of the first embodiment, showing a state in which a cover member is transparent.
Figure 4:
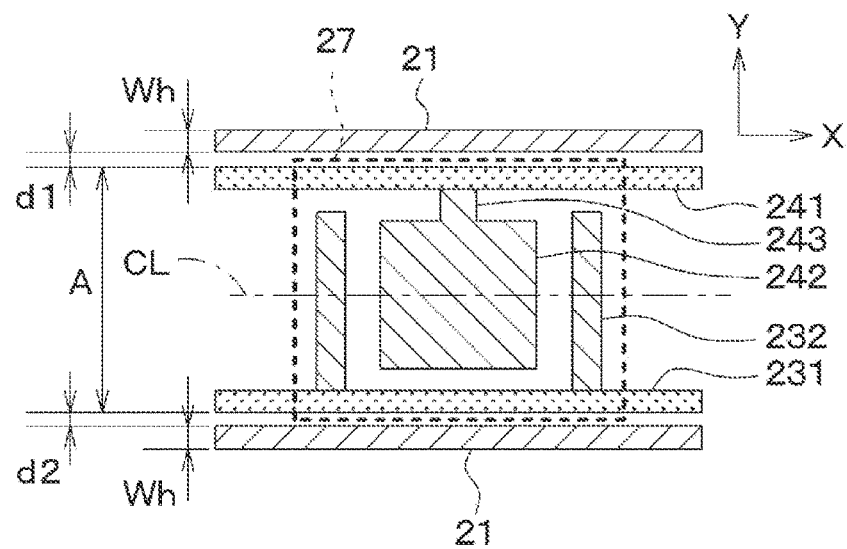
FIG. 4 is a partial enlarged view of FIG. 3.
Figure 5:
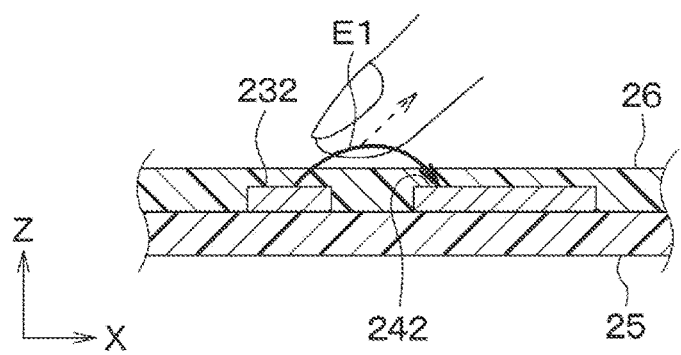
FIG. 5 is a cross-sectional view taken along a line V-V in FIG. 3.

The configurations of the heater device 20 will be described with reference to FIGS. 3 to 5. As shown in FIGS. 3 to 5, the heater device 20 includes an insulating substrate 25, a heat generating portion 21, a heat equalizing portion 27, and a cover member 26. In FIG. 4, different hatching is attached to each part. This hatch does not show a cross section.

The insulating substrate 25 is composed of a plate-shaped member extending along an XY plane defined by an axis X and an axis Y. The insulating substrate 25 has a thickness in a direction of an axis Z. The insulating substrate 25 is formed in a substantially quadrangular thin plate shape. The insulating substrate 25 is made of a resin material having high insulating properties and withstanding high temperatures, for example, a polyimide film. The heat generating portion 21, the heat equalizing portion 27, and the cover member 26 are formed on a surface of the insulating substrate 25 on the occupant side. A thermal conductivity of the insulating substrate 25 is lower than that of the heat generating portion 21 and the heat equalizing portion 27.

The heat generating portion 21 has a linear shape and is formed so as to meander on one surface of the insulating substrate 25. That is, on one surface of the insulating substrate 25, the heat generating portion 21 forming a linear shape is formed so as to meander greatly.

As described above, since the heat generating portion 21 is formed so as to meander greatly, the temperature distribution can be made uniform.

Further, since the heat generating portion 21 has a linear shape, when a occupant's finger or the like comes into contact with the heat generating portion 21, heat transfer to the finger or the like is suppressed. As a result, the temperature of the contacted portion can be rapidly lowered, and a thermal discomfort of the occupant can be suppressed.

The heat generating portion 21 is made of a member having conductivity. For example, the heat generating portion 21 may be made of copper, alloy of copper and tin (Cu—Sn), a metal such as silver, tin, stainless steel, nickel, and nichrome, or alloy including at least one of silver, tin, stainless steel, nickel or nichrome.

Connection terminals 28 are formed at both ends of the heat generating portion 21. Each connection terminal 28 is connected to a control unit (not shown).

The heat equalizing portion 27 has a first power line 231, second power line 241, a heat dissipation parts 232 and 242, and a connection part 233.

The first power line 231, the second power line 241, the heat dissipation parts 232 and 242, and the connection part 233 are made of a conductive member. Specifically, the conductive member can be composed of metals such as copper, alloys of copper and tin (Cu—Sn), silver, tin, stainless steel, nickel, and nichrome, and alloys containing these metals.

The first power line 231 has a linear shape and is formed so as to extend along one of the adjacent heat generating portions. The second power line 241 has a linear shape and is formed so as to extend along the other adjacent heat generating portion 21.

The heat dissipation part 232 is arranged between the first power line 231 and the second power line 241. The heat dissipation part 232 is connected to the first power line 231 and dissipates the heat of the heat generating portion 21.

The heat dissipation part 242 and the connection part 243 are arranged between the first power line 231 and the second power line 241. The heat dissipation part 242 is connected to the second power line 241 via the connection part 243 and dissipates the heat of the heat generating portion 21. The heat dissipation part 242 has a rectangular shape.

Two heat dissipation parts 232 are formed so as to branch from the middle of the first power line 231 toward the second power line 241 side. The two heat dissipation parts 232 are arranged so as to sandwich the heat dissipation part 242.

That is, the heat equalizing portion 27 has the first power line 231 extending along one adjacent heat generating portion 21 and the second power line 241 extending along the other adjacent heat generating portion 21. The heat equalizing portion 27 further includes two heat dissipation parts 232 that branch from the middle of the first power line 231 toward the second power line 241 and one heat dissipation part 242 that branches from the middle of the second power line 241 toward the first power line 231. The heat dissipation part 242 is arranged so as to be sandwiched between the two heat dissipation parts 232.

Further, a distance d1 between one of adjacent heat generating portions 21 and the heat equalizing portion 27 and a distance d2 between the other of adjacent heat generating portions 21 and the heat equalizing portion 27 are both equal to or less than a line width Wh of the heat generating portion 21.

Further, in the heat equalizing portion 27, a distance A between one end of one of adjacent heat generating portions 21 and the other end of the other of adjacent heat generating portions 21 is longer than the line width Wh of the heat generating portion 21. Each distances d1 and d2 represents a linear distance.

The heat equalizing portion 27 is arranged so as to straddle a center line CL connecting the centers of the heat generating portions 21, which is formed so that one end of the adjacent heat generating portion 21 side and the other end of the adjacent heat generating portion 21 side are adjacent to each other.

Further, the heat equalizing portion 27 has the first power line 231 forming a linear shape and extending along one of the adjacent heat generating portions 21, and the second power line 241 forming a linear shape and extending along the other of the adjacent heat generating portions 21.

Further, the heat equalizing portion 27 has the heat dissipation part 232 that is arranged between the first power line 231 and the second power line 241 and is connected to the first power line 231 to dissipate the heat of the heat generating portion 21. The heat equalizing portion 27 further has the heat dissipation part 242 arranged between the first power line 231 and the second power line 241 and connected to the second power line 241 to dissipate the heat of the heat generating portion 21.

When a predetermined voltage is applied between the first power line 231 and the second power line 241 by a control unit (not shown), an electric field is formed between the heat dissipation part 232 and the heat dissipation part 242 as shown in FIG. 5.

A connection terminal 291 is connected to the first power line 231 and a connection terminal 292 is connected to the second power line 241. The plurality of connection terminals 291 are connected to each other via a connection line (not shown), and the plurality of connection terminals 292 are also connected to each other via a connection line (not shown).

Further, the heat equalizing portion 27 and the heat generating portion 21 are formed so that a length of a perpendicular line drawn from the heat equalizing portion 27 to the heat generating portion 21 has a constant length.

When a voltage is applied between the two connection terminals 28 arranged at both ends of the heat generating portion 21, the heat generating portion 21 generates heat. The heat of the heat generating portion 21 propagates to the heat equalizing portion 27 and is dissipated by the heat equalizing portion 27.

Further, when a predetermined voltage is applied between the connection terminal 291 and the connection terminal 292, an electric field E is formed between the heat dissipation part 242 and the heat dissipation part 232 as shown in FIG. 5. Here, for example, when a human finger comes close to or comes into contact between the heat dissipation part 242 and the heat dissipation part 232, a part of the electric field E is transferred to the human finger, the electric field E detected by the heat dissipation part 232 decreases, and a capacitance between the heat dissipation part 242 and the heat dissipation part 232 changes.

The control device (not shown) determines that the human finger is close or in contact based on whether or not the change in capacitance between the heat dissipation part 242 and the heat dissipation part 232 is equal to or greater than a threshold value. When the contact or proximity of an object is detected, the control device lowers the amount of energization to the heat generating portion 21 from the normal state or stops the energization. Therefore, a thermal discomfort to the occupant can be reduced.

Figure 6:
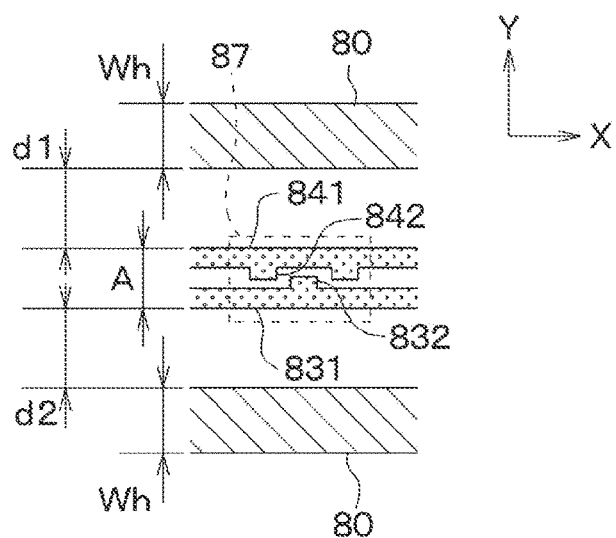
FIG. 6 is a comparative example with respect to FIG. 3.

FIG. 6 shows a configuration of a comparative example. The heat equalizing portion 87 of this comparative example has a first power line 831 and a second power line 841. Further, the heat equalizing portion 87 has a heat dissipation part 832 connected to the first power line 831 and a heat dissipation part 842 connected to the second power line 841, and these heat dissipation parts 832 and 842 are arranged between the first power line 831 and the second power line 841. In this comparative example, a distance d1 between one of adjacent heat generating portions 80 and the heat equalizing portion 87 and a distance d2 between the other of adjacent heat generating portions 80 and the heat equalizing portion 87 are longer than a line width Wh of the heat generating portion 80. Further, in this comparative example, in the heat equalizing portion 87, a distance A between one end of one of the adjacent heat generating portions 80 and the other end of the other of the adjacent heat generating portions 80 is larger than the line width Wh of the heat generating portion 80.

In such a configuration, the distance d1 between the heat generating portion 80 and the heat equalizing portion 87 and the distance d2 between the heat generating portion 80 and the heat equalizing portion 87 are relatively long, so that the heat of the heat generating portion 80 is difficult to be transferred to the equalizing portion 87, and a thermal conductivity is low.

Further, in the heat equalizing portion 87, the distance A between one end of one of heat generating portions 80 and the other end of the other of heat generating portions 80 is longer than the line width Wh of the heat generating portion 80, so that the heat of the heat generating portion 80 cannot be efficiently dissipated.

On the other hand, in the heater device of the present embodiment, as shown in FIG. 4, both the distance d1 between one of adjacent heat generating portions 21 and the heat equalizing portion 27 and the distance d2 between the other of adjacent heat generating portions 21 and the heat equalizing portion 27 are equal to or less than the line width Wh of the heat generating portion 21. Therefore, the heat of the heat generating portion 21 is easily transferred to the heat equalizing portion 27, and the heat conductivity is excellent.

Further, in the heat equalizing portion 27 of the heater device of the present embodiment, the distance A between one end of one of adjacent heat generating portions 21 and the other end of the other of adjacent heat generating portions 21 is longer than the line width Wh of the heat generating portion 21. Therefore, the heat of the heat generating portion 21 can be efficiently dissipated.

As described above, the heater device includes the heat generating portion 21 that is formed so as to be adjacent to one surface of an insulating substrate 25 and generates heat by energization, and the heat equalizing portion 27 that is arranged between the adjacent heat generating portions 21 and diffuses the heat of the heat generating portion 21 in a surface direction of one surface.

Further, the heat generating portion 21 has a linear shape, and at least one of the distance d1 between one of adjacent heat generating portions 21 and the heat equalizing portion 27 and the distance d2 between the other of adjacent heat generating portions 21 and the heat equalizing portion 27 is equal to or less than the line width Wh of the heat generating portion.

Further, in the heat equalizing portion 27, the distance A between one end of one of adjacent heat generating portions 21 and the other end of the other of adjacent heat generating portions 21 is longer than the line width Wh of the heat generating portion 21.

According to the above configuration, at least one of the distance d1 between one of adjacent heat generating portions 21 and the heat equalizing portion 27 and the distance d2 between the other of adjacent heat generating portions 21 and the heat equalizing portion 27 is equal to or less than the line width Wh of the heat generating portion 21. Therefore, the heat transfer from the heat generating portion 21 to the heat equalizing portion 27 can be ensured. Further, in the heat equalizing portion 27, the distance A between one end of one of adjacent heat generating portions 21 and the other end of the other of adjacent heat generating portions 21 side is longer than the line width Wh of the heat generating portion 21. Therefore, the heat of the heat generating portion can be transferred between the adjacent heat generating portions 21 and efficiently dissipated. Therefore, the temperature distribution can be further made uniform.

Further, the heat equalizing portion 27 and the heat generating portion 21 are formed so that a length of a perpendicular line drawn from the heat equalizing portion 27 to the heat generating portion 21 has a constant length. According to this configuration, the heat of the heat generating portion 21 can be evenly propagated to the heat equalizing portion 27.

Further, the heat equalizing portion 27 has the first power line 231 forming a linear shape and extending along one of the adjacent heat generating portions 21, and the second power line 241 forming a linear shape and extending along the other of the adjacent heat generating portions 21. Further, the heat equalizing portion 27 has a heat dissipation part 232 connected to the first power line 231 and a heat dissipation part 242 connected to the second power line 241, and these heat dissipation parts 232 and 242 are arranged between the first power line 231 and the second power line 241.

Therefore, the heat equalizing portion 27 can function as an electrode that forms an electric field for detecting an object.

The heat dissipation part 232, 242 is arranged so as to straddle a center line CL connecting the centers of the heat generating portions 21, which is formed so that one end of the adjacent heat generating portion 21 side and the other end of the adjacent heat generating portion 21 side are adjacent to each other.

Therefore, the heat of the heat generating portion 21 can be transferred to the portion farthest from the two adjacent heat generating portions 21, and the heat can be efficiently dissipated.

Second Embodiment

Figure 7:
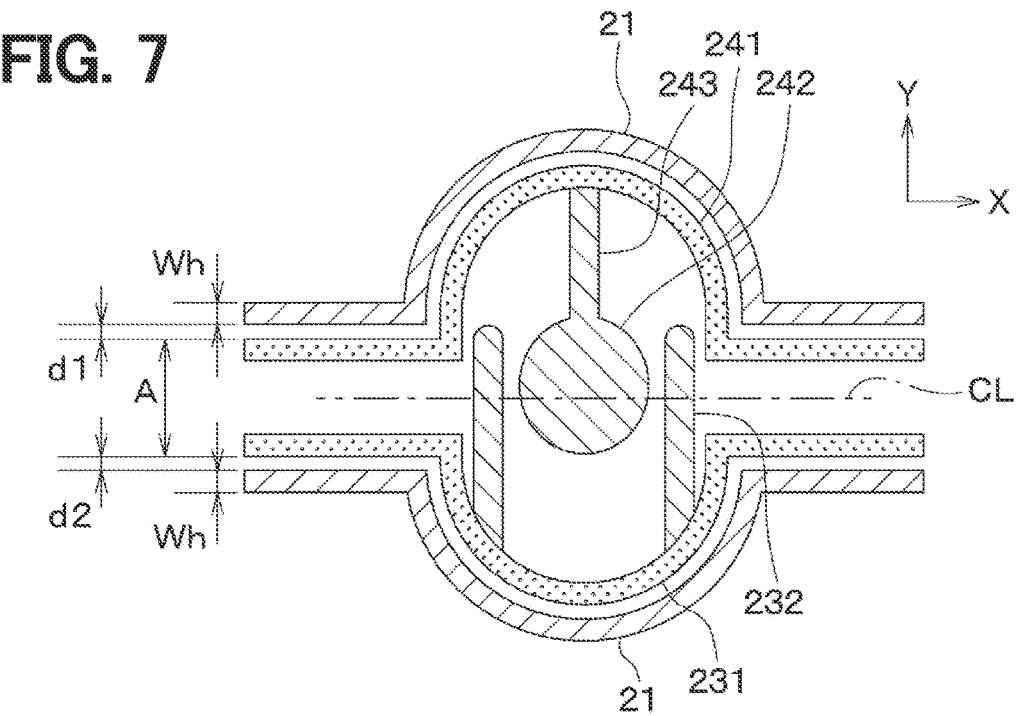
FIG. 7 is a partially enlarged view of a heater device according to a second embodiment, and is a view corresponding to FIG. 4.

The heater device according to a second embodiment will be described with reference to FIG. 7. In the heater device of the present embodiment, the adjacent heat generating portions 21 have curved portions having a curved shape. Further, the first power line 231 and the second power line 241 also have a curved portion forming a curved shape. The first power line 231 is formed along one of the adjacent heat generating portions 21, and the second power line 241 is formed along the other of the adjacent heat generating portions 21. Further, the heat dissipation part 242 has a circular shape.

In this heater device, as in the first embodiment, the distance d1 between one of the adjacent heat generating portions 21 and the heat equalizing portion 27 and the distance d2 between the other of the adjacent other heat generating portions 21 and the heat equalizing portion 27 are equal to or less than the line width Wh of the heat generating portion 21.

Further, in the heat equalizing portion 27, the distance A between one end of one of the adjacent heat generating portions 21 and the other end of the other of the adjacent heat generating portions 21 is longer than the line width Wh of the heat generating portion 21.

Further, the heat generating portion having a linear shape can be regarded as a wire stretched in a tense state, and sufficient strength cannot be secured when an external force is applied to the heat generating portion.

On the other hand, the heat generating portion 21 having a curved shape can be regarded as a wire loosely stretched so as to be curved, and it is possible to secure more strength when an external force is applied to the heat generating portion 21 as compared with the heat generating portion having the linear shape.

Similarly, for the first power line 231 and the second power line 241 having a curved shape, it is possible to secure more strength when an external force is applied to the power lines 231 and 241 as compared with the power lines having a linear shape.

In the present embodiment, the same advantages as those obtained from the configuration common to the first embodiment can be obtained in the same manner as in the first embodiment.

Third Embodiment

Figure 8:
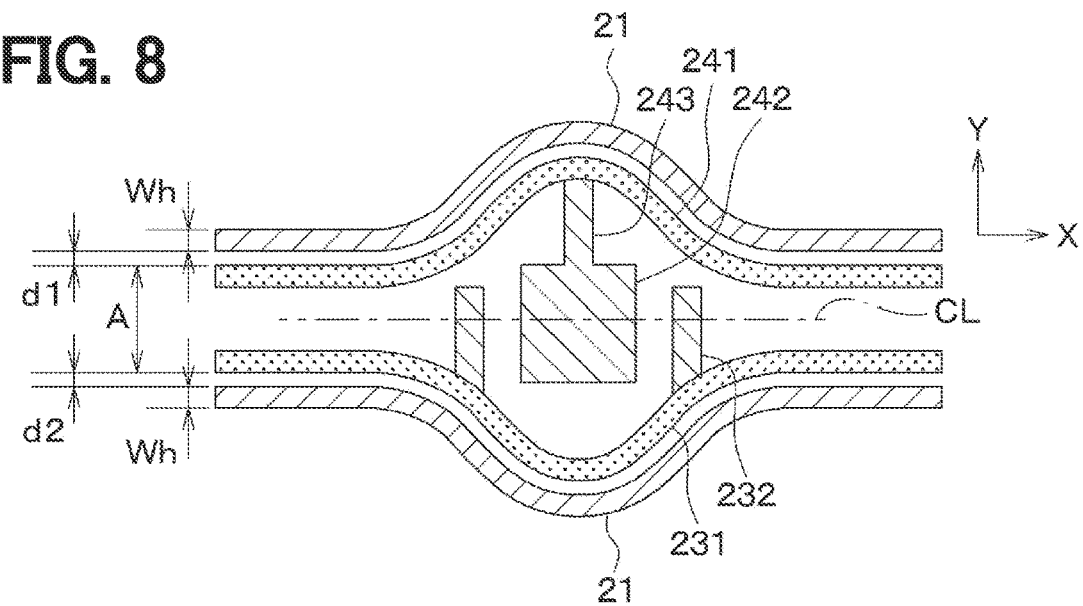
FIG. 8 is a partially enlarged view of a heater device according to a third embodiment.

The heater device according to a third embodiment will be described with reference to FIG. 8. In the heater device of the present embodiment, the adjacent heat generating portions 21 have curved portions having a curved shape. Further, the first power line 231 and the second power line 241 also have a curved portion forming a curved shape. The first power line 231 is formed along one of the adjacent heat generating portions 21, and the second power line 241 is formed along the other of the adjacent heat generating portions 21. Further, the heat dissipation part 242 has a rectangular shape.

The heat generating portion 21 has a straight part forming a straight shape and a curved part forming a curved shape, and is formed so that a boundary between the straight part and the curved part is continuous.

The first power line 231 and the second power line 241 also have a straight part forming a straight shape and a curved part forming a curved shape, and are formed so that a boundary between the straight part and the curved part is continuous.

In the present embodiment, the same advantages as those obtained from the configuration common to the first embodiment can be obtained in the same manner as in the first embodiment.

Fourth Embodiment

Figure 9:
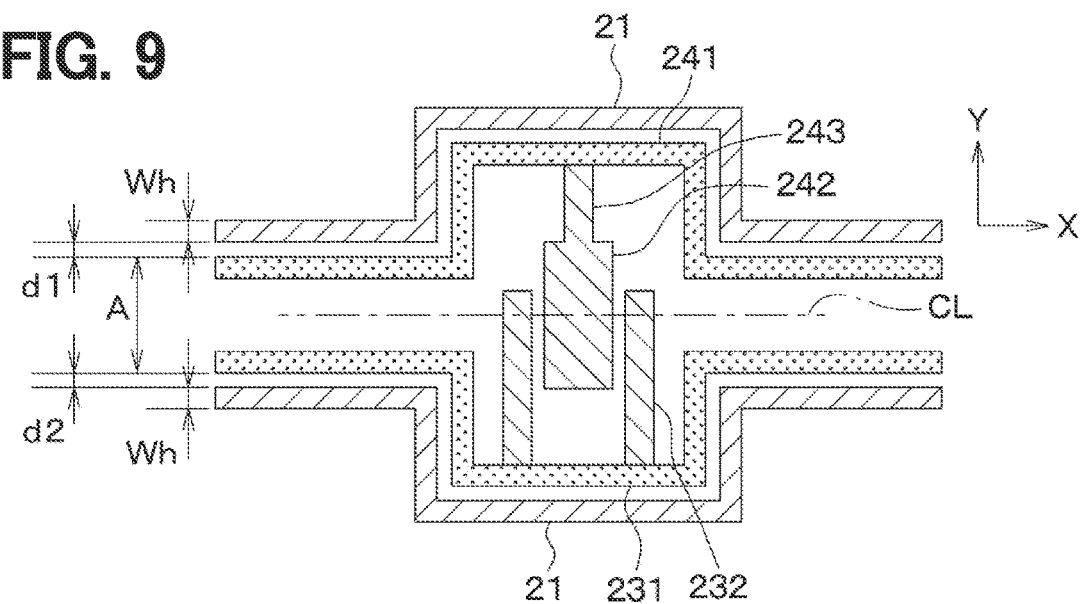
FIG. 9 is a partially enlarged view of a heater device according to a fourth embodiment.

The heater device according to a fourth embodiment will be described with reference to FIG. 9. In the heater device of the present embodiment, the heat generating portion 21 is composed of a plurality of straight parts having a straight shape, and is formed so as to project to an opposite side to the adjacent heat generating portions 21. The first power line 231 and the second power line 241 are also composed of a plurality of straight parts forming a straight shape. The first power line 231 is formed along one of the adjacent heat generating portions 21, and the second power line 241 is formed along the other of the adjacent heat generating portions 21.

In the present embodiment, the same advantages as those obtained from the configuration common to the first embodiment can be obtained in the same manner as in the first embodiment.

Fifth Embodiment

Figure 10:
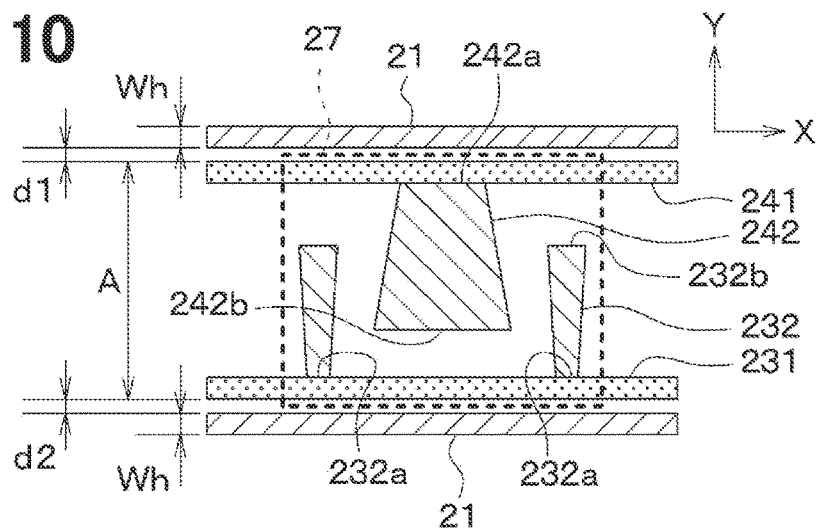
FIG. 10 is a partially enlarged view of a heater device according to a fifth embodiment.

The heater device according to a fifth embodiment will be described with reference to FIG. 10. The heat dissipation part 232 of the heater device of the present embodiment has a first side 232a connected to the first power line 231 and a second side 232b facing the first side 232a. Further, the heat dissipation part 242 has a first side 242a connected to the second power line 241 and a second side 242b facing the first side 242a.

A length of the second side 232b is longer than a length of the first side 232a. Further, a length of the second side 242b is longer than a length of the first side 242a.

As a result, heat can be efficiently dissipated at a portion distant from the first power line 231 extending along the heat generating portion 21. Further, heat can be efficiently dissipated at a portion distant from the second power line 241 extending along the heat generating portion 21.

In the present embodiment, the same advantages as those obtained from the configuration common to the first embodiment can be obtained in the same manner as in the first embodiment.

Sixth Embodiment

Figure 11:
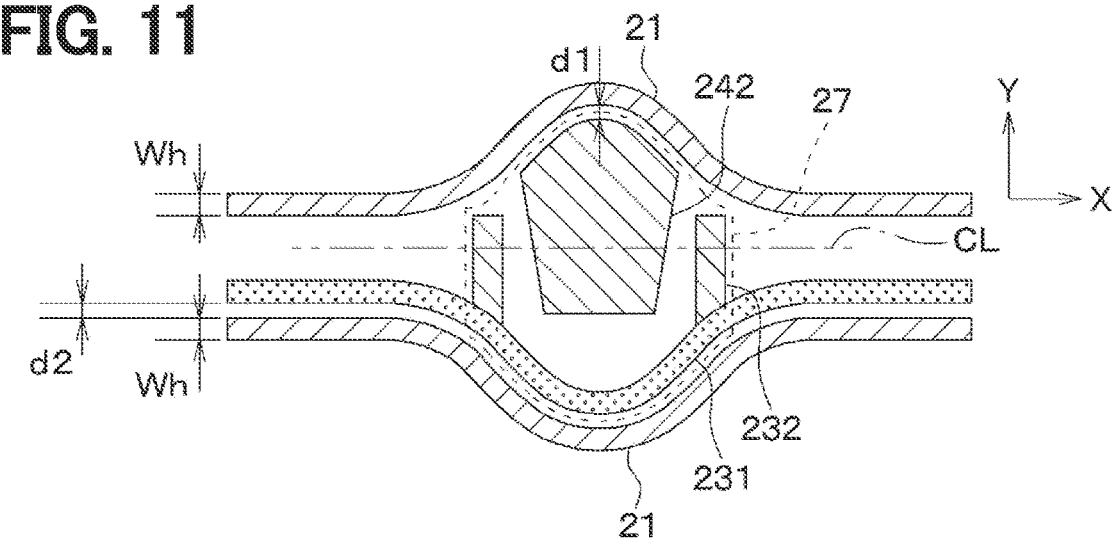
FIG. 11 is a partially enlarged view of a heater device according to a sixth embodiment.

The heater device according to a sixth embodiment will be described with reference to FIG. 11. The heater device of the present embodiment does not have the second power line 241 in the heater device of each of the above embodiments.

The adjacent heat generating portions 21 each have a curved part having a curved shape. Further, the heat dissipation part 242 is formed along the curved part of the heat generating portion 21.

The heat equalizing portion 27 and the heat generating portion 21 are formed so that a length of a perpendicular line drawn from the heat equalizing portion 27 to the heat generating portion 21 has a constant length. Specifically, the length of the perpendicular line drawn from the heat equalizing portion 27 to the heat generating portion 21 is formed to be a constant length.

According to this configuration, the heat of the heat generating portion 21 can be evenly propagated to the heat equalizing portion 27.

Although the heater device of the present embodiment does not have the second power line 241 in the heater device of each of the above embodiments, the heater device may have the second power line 241.

In the present embodiment, the same advantages as those obtained from the configuration common to the first embodiment can be obtained in the same manner as in the first embodiment.

Seventh Embodiment

Figure 12:
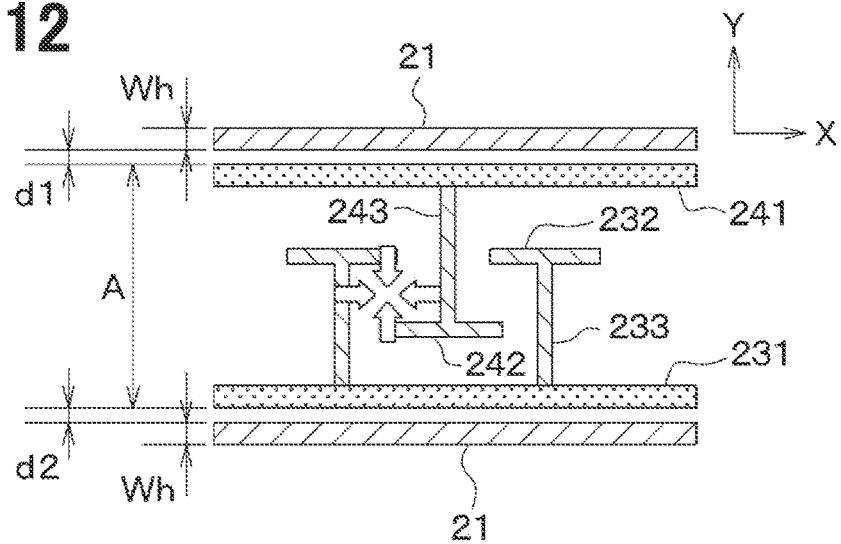
FIG. 12 is a partially enlarged view of a heater device according to a seventh embodiment.

The heater device according to a seventh embodiment will be described with reference to FIG. 12. In the heater device of the present embodiment, the heat equalizing portion 27 has a first power line 231 and a second power line 241, a heat dissipation part 232, 242, and a connection part 233, 243.

The connection part 233 is formed so as to extend from the middle of the first power line 231 toward the second power line 241 side. Further, the heat dissipation part 232 is formed at a tip of the connection part 233 so as to extend in a direction orthogonal to the connection part 233.

The connection part 243 is formed so as to extend from the middle of the second power line 241 toward the first power line 231 side. Further, the heat dissipation part 242 is formed at the tip of the connection part 243 so as to extend in a direction orthogonal to the connection part 243.

According to such a configuration, the heat of the heat generating portion 21 is radiated from the heat dissipation part 232 and the heat dissipation part 242 in an area interposed between the connection part 233 and the connection part 243. The heat of the heat generating portion 21 can be transferred to the area away from the heat generating portion 21 and efficiently dissipated.

In the present embodiment, the same advantages as those obtained from the configuration common to the first embodiment can be obtained in the same manner as in the first embodiment.

Eighth Embodiment

Figure 13:
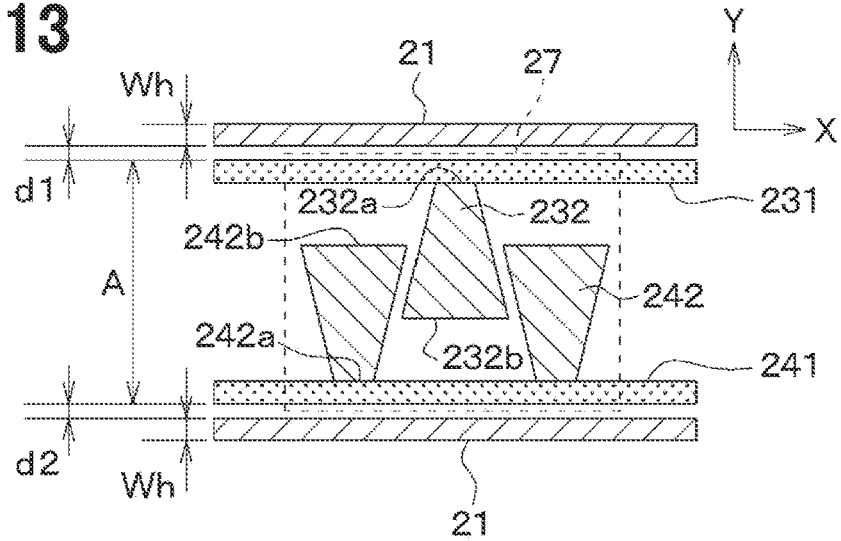
FIG. 13 is a partially enlarged view of a heater device according to an eighth embodiment.

The heater device according to an eighth embodiment will be described with reference to FIG. 13. The heater device of the present embodiment has a plurality of heat dissipation parts 232 and 242. When a plurality of heat dissipation parts 232 and 242 are projected from one of the adjacent heat generation portions 21 to the other of the adjacent heat generation portions 21, the plurality of heat dissipation parts 232 and 242 are formed so that the projection regions of the plurality of heat dissipation parts 232 and 242 overlap each other. According to this configuration, it is possible to prevent the temperature of the adjacent heat dissipation parts 232 and 242 from dropping.

In the present embodiment, the same advantages as those obtained from the configuration common to the first embodiment can be obtained in the same manner as in the first embodiment.

Ninth Embodiment

Figure 14:
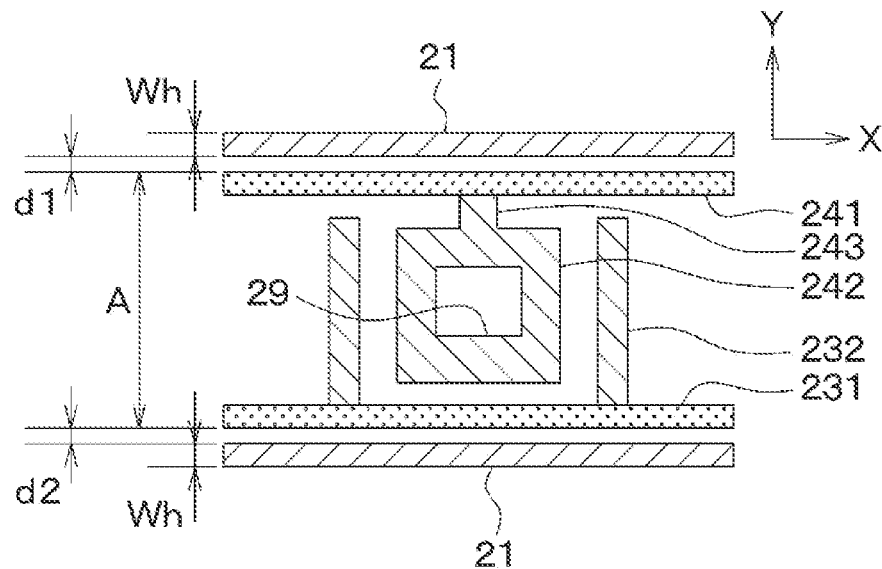
FIG. 14 is a partially enlarged view of a heater device according to a ninth embodiment.

The heater device according to a ninth embodiment will be described with reference to FIG. 14. In the heater device of the present embodiment, a low thermal conductive section 29 having a lower thermal conductivity than the heat dissipation part 242 is formed in the heat dissipation part 242 in comparison with the heater device 20 of the first embodiment.

The low thermal conductive section 29 has a rectangular shape. The low thermal conductive section 29 is formed inside an outer periphery of the heat dissipation part 242. The low thermal conductive section 29 is formed by removing a conductive member in the region of the low thermal conductive section 29 from the heat dissipation part 242 composed of the conductive member and by exposing the insulating substrate 25. That is, the thermal conductivity of the low thermal conductive section 29 is the same as the thermal conductivity of the insulating substrate 25.

As described above, in the heater device of the present embodiment, the low thermal conductive section 29 having a thermal conductivity lower than that of the heat dissipation part 242 is formed inside the outer periphery of the heat dissipation part 242.

According to this configuration, the heat transfer in the heat dissipation part 242 is suppressed by the low thermal conductive section 29, and when the object comes into contact with the heat dissipation part 242, the temperature of the contacted portion can be rapidly lowered.

Tenth Embodiment

Figure 15:
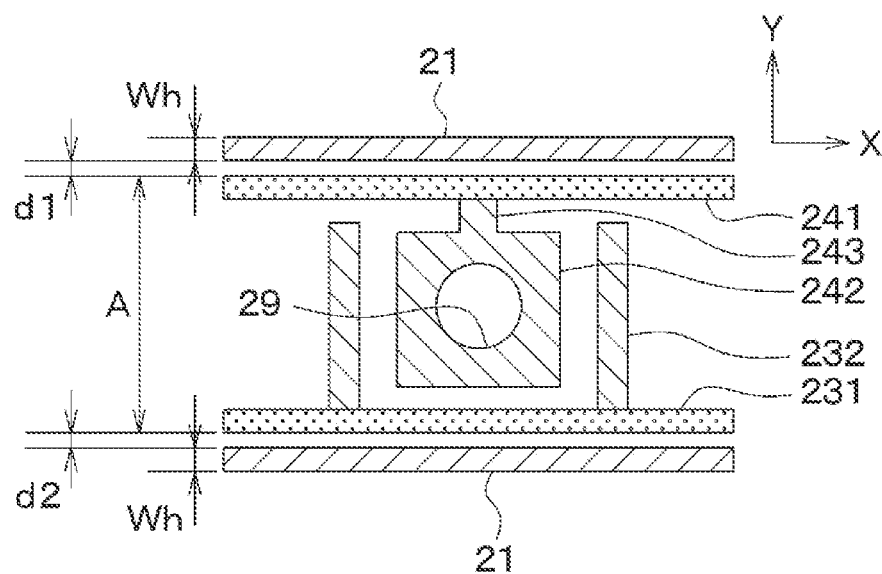
FIG. 15 is a partially enlarged view of a heater device according to a tenth embodiment.

The heater device according to a tenth embodiment will be described with reference to FIG. 15. In the heater device of the ninth embodiment, the shape of the low heat conductive section 29 has a rectangular shape. On the other hand, in the heater device of the present embodiment, the shape of the low heat conductive section 29 has a circular shape. In this way, the shape of the low heat conductive section 29 may have a circular shape.

Eleventh Embodiment

Figure 16:
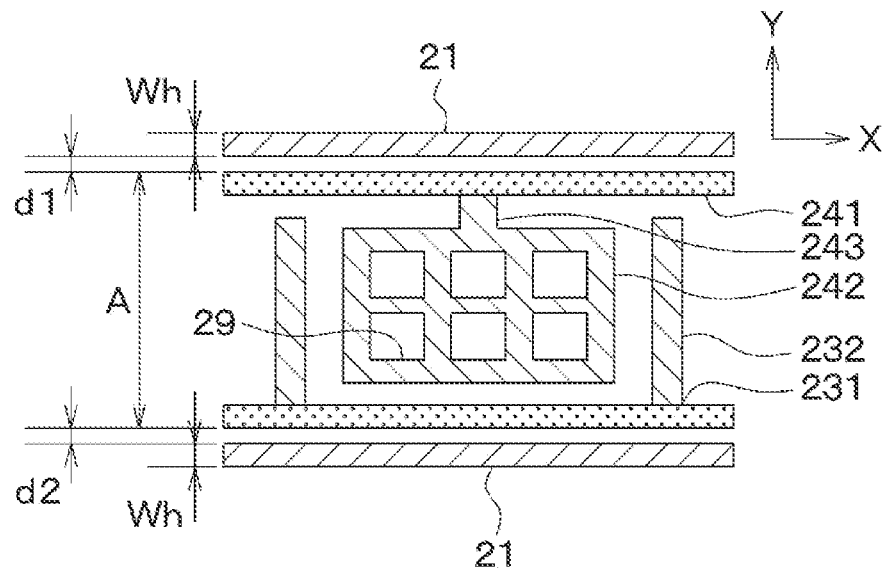
FIG. 16 is a partially enlarged view of a heater device according to an eleventh embodiment.

The heater device according to an eleventh embodiment will be described with reference to FIG. 16. In the heater device of the ninth embodiment, one rectangular low heat conductive section 29 is formed in the heat dissipation part 242. On the other hand, in the heater device of the present embodiment, a plurality of rectangular low heat conductive sections 29 are formed in the heat dissipation part 242. In this way, a plurality of rectangular low heat conductive sections 29 may be formed in the heat dissipation part 242.

Twelfth Embodiment

Figure 17:
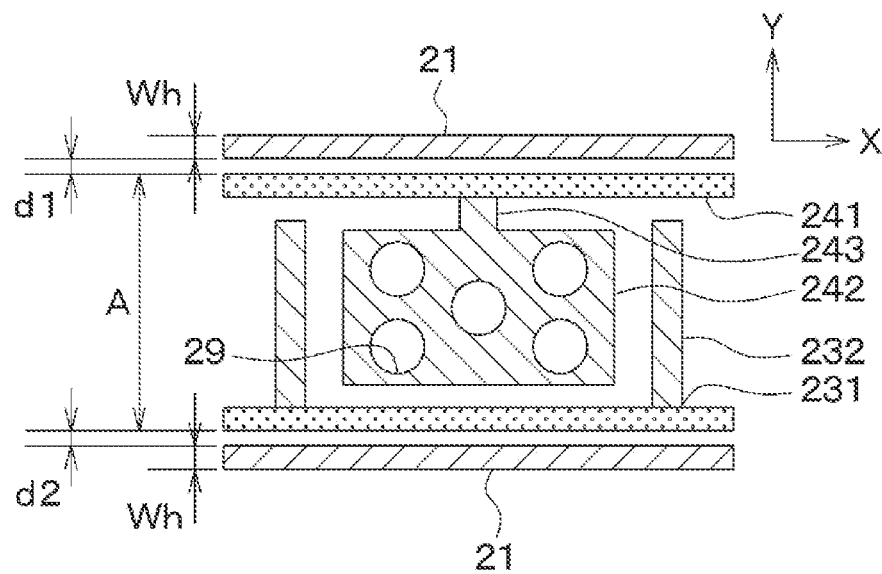
FIG. 17 is a partially enlarged view of a heater device according to a twelfth embodiment.

The heater device according to a twelfth embodiment will be described with reference to FIG. 17. In the heater device of the tenth embodiment, one circular low heat conductive section 29 is formed in the heat dissipation part 242. On the other hand, in the heater device of the present embodiment, a plurality of circular low heat conductive sections 29 are formed in the heat dissipation part 242. In this way, a plurality of circular low heat conductive sections 29 may be formed in the heat dissipation part 242.

Thirteenth Embodiment

Figure 18:
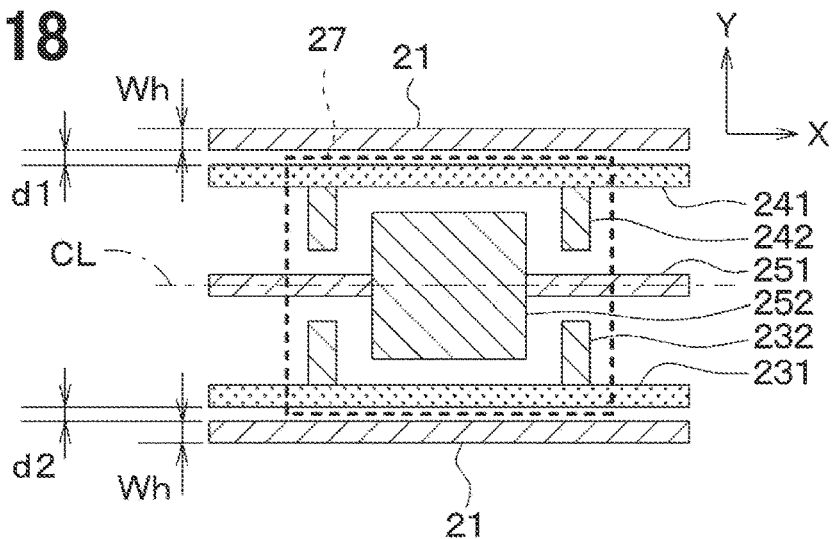
FIG. 18 is a partially enlarged view of a heater device according to a thirteenth embodiment.

The heater device according to a thirteenth embodiment will be described with reference to FIG. 18. The heat equalizing portion 27 of the heater device of the present embodiment has a heat dissipation part 252 in addition to the heat dissipation part 232 and the heat dissipation part 242. Further, the heat equalizing portion 27 of the heater device of the present embodiment has a third power line 251 in addition to the first power line 231 and the second power line 241.

The heat dissipation part 232 and the heat dissipation part 242 are arranged between the first power line 231 and the second power line 241. The heat dissipation part 232 is connected to the first power line 231 and the heat dissipation part 242 is connected to the second power line 241. A plurality of heat dissipation parts 232 are formed so as to branch from the middle of the first power line 231 toward the second power line 241 side. Further, a plurality of heat dissipation parts 242 are formed so as to branch from the middle of the second power line 241 toward the first power line 231 side. The heat dissipation part 232 is formed so as to be orthogonal to the first power line 231 and the heat dissipation part 242 is formed so as to be orthogonal to the second power line 241.

The heat dissipation part 252 has a rectangular shape. Further, the heat dissipation part 252 is arranged between the first power line 231 and the second power line 241 and is connected to the third power line 251 so as to dissipate the heat of the heat dissipation part 252. Further, the heat dissipation part 252 is arranged between the two heat dissipation parts 232 and the two heat dissipation parts 242.

The first power line 231 has a linear shape and is formed so as to extend in a direction of an arrow X along one of the adjacent heat generating portions 21. The second power line 241 has a linear shape and is formed so as to extend in the direction of the arrow X along the other of the adjacent heat generating portions 21. The third power line 251 extends in the direction of the arrow X and is formed so as to be interposed between the first power line 231 and the second power line 241. The third power line 251 is formed so as to be parallel to the first power line 231 and parallel to the second power line 241. Further, a length of the perpendicular line drawn from the third power line 251 to the first power line 231 is the same as a length of the perpendicular line drawn from the third power line 251 to the second power line 241.

The third power line 251 is formed to extend from one end of the heat dissipation part 252 in the arrow X direction to one side in the arrow X direction, and also to extend from the other end of the heat dissipation part 252 in the arrow X direction to the other side in the arrow X direction. The first power line 231 and the second power line 241 each function as a transmitting electrode, and the third power line 251 is configured to function as a receiving electrode.

The third power line 251 is grounded. When a predetermined voltage is applied to the first power line 231 and the second power line 241 by a control unit (not shown), an electric field is formed between the first power line 231 and the third power line 251 and an electric field is formed between the second power line 241 and the third power line 251. As a result, in addition to the electric lines of force going from the first power line 231 to the third power line 251, the electric lines of force going from the second power line 241 to the third power line 251 are generated, so that the accuracy of the detection function can be improved.

Further, in the heater device, the third power line 251 that functions as a receiving electrode is formed so as to be surrounded by the first power line 231 and the second power line 241 that both function as transmitting electrodes. Therefore, it is possible to suppress the influence on noise from the surroundings and prevent malfunction.

As described above, the heat equalizing portion 27 has the first power line 231 forming a linear shape and extending along one of the adjacent heat generating portions 21, and the second power line 241 forming a linear shape and extending along the other of the adjacent heat generating portions 21. Further, the heat equalizing portion 27 has a third power line 251 arranged between the first power line 231 and the second power line 241. Further, the heat equalizing portion 27 has the heat dissipation part 232, 242 that dissipates the heat of the heat generating portion 21. The heat dissipation part 232, 242 is arranged between the first power line 231 and the second power line 241, and is connected to the first power line 231 and the second power line 241.

As a result, in addition to the electric lines of force going from the first power line 231 to the third power line 251, the electric lines of force going from the second power line 241 to the third power line 251 are generated, so that the accuracy of the detection function can be improved.

Fourteenth Embodiment

Figure 19:
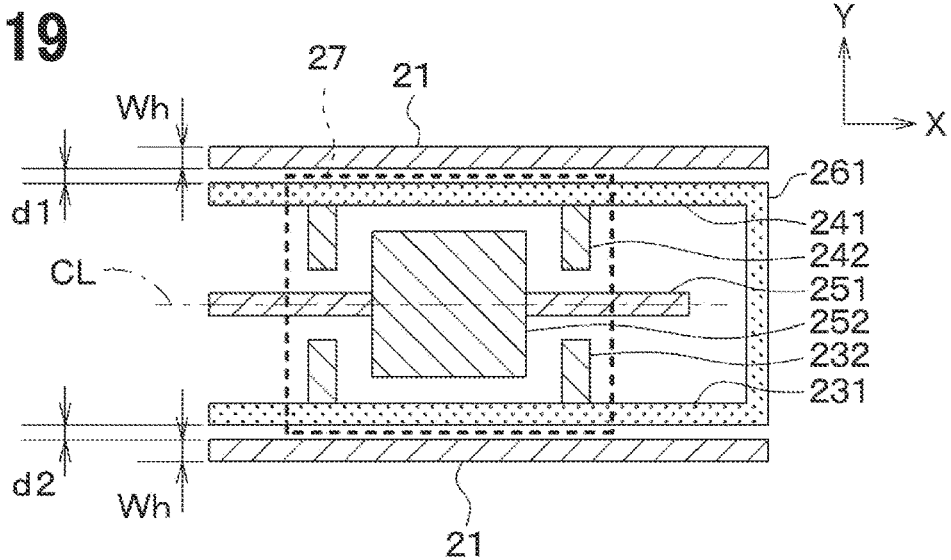
FIG. 19 is a partially enlarged view of a heater device according to a fourteenth embodiment.

The heater device according to a fourteenth embodiment will be described with reference to FIG. 19. The heater device of the present embodiment further includes a fourth power line 261 in comparison with the heater device of the thirteenth embodiment.

The fourth power line 261 is formed so as to extend in the arrow Y direction, that is, in a direction orthogonal to the direction in which the first power line 231 and the second power line 241 extend. The fourth power line 261 is connected between one end of the first power line 231 in the arrow X direction and one end of the second power line 241 in the arrow X direction.

In this way, by adding the fourth power line 261, the heat equalizing portion 27 is surrounded by the first power line 231 and the second power line 241 and the fourth power line 261 so that the influence on the noise from the surroundings is further suppressed and it is possible to prevent malfunction.

Fifteenth Embodiment

Figure 20:
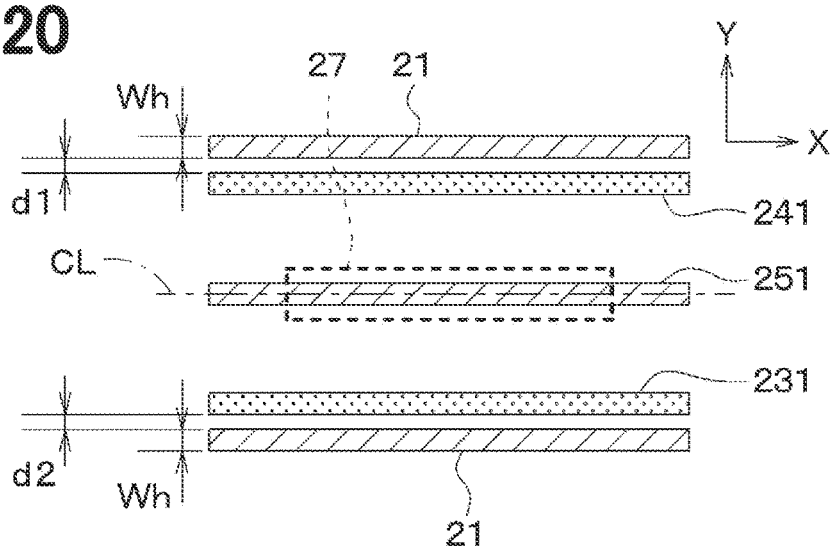
FIG. 20 is a partially enlarged view of a heater device according to a fifteenth embodiment.

The heater device according to a fifteenth embodiment will be described with reference to FIG. 20. The heater device of the present embodiment is different from the heater device of the thirteenth embodiment in that it does not have the heat dissipation part 232, the heat dissipation part 242, and the heat dissipation part 252. In this way, the heat dissipation part 232, the heat dissipation part 242, and the heat dissipation part 252 may be omitted.

Other Embodiments

Further, both the distance d1 between one of the adjacent heat generating portions 21 and the heat equalizing portion 27 and the distance d2 between the other of the adjacent heat generating portions 21 and the heat equalizing portion 27 are equal to or less than the line width Wh of the heat generating portion 21.

On the other hand, at least one of the distance d1 between one of the adjacent heat generating portion 21 and the heat equalizing portion 27 and the distance d2 between the other of the adjacent heat generating portions 21 and the heat equalizing portion 27 may be configured to be equal to or less than the line width Wh of the heat generating portion 21.

(2) In the ninth to twelfth embodiments, the low thermal conductive section 29 is formed by removing a conductive member in the region of the low thermal conductive section 29 from the heat dissipation part 242 composed of the conductive member and by exposing the insulating substrate 25. However, the low thermal conductive section 29 can also be formed of a material having a higher thermal conductivity than the insulating substrate 25 and a lower thermal conductivity than the heat generating portion.

(3) In each of the above embodiments, the line width Wh of the heat generating portion 21 is constant, but the line width Wh of the heat generating portion 21 does not have to be constant. For example, in a portion where the line width Wh of the heat generating portion 21 is a first line width, at least one of the distance d1 between one of the adjacent heat generating portions 21 and the heat equalizing portion 27 and the distance d2 between the other of the adjacent heat generating portions 21 and the heat equalizing portion 27 may be configured so as to be equal to or less than the first line width of the heat generating portion. Further, in a portion where the line width Wh of the heat generating portion 21 is a second line width being longer than the first line width, at least one of the distance d1 between one of the adjacent heat generating portions 21 and the heat equalizing portion 27 and the distance d2 between the other of the adjacent heat generating portions 21 and the heat equalizing portion 27 may be configured so as to be equal to or less than the second line width of the heat generating portion.

The present disclosure is not limited to the above-described embodiments, and can be appropriately modified. The embodiments described above are not independent of each other, and can be appropriately combined except when the combination is obviously impossible. The constituent element(s) of each of the above embodiments is/are not necessarily essential unless it is specifically stated that the constituent element(s) is/are essential in the above embodiment, or unless the constituent element(s) is/are obviously essential in principle. Furthermore, in each of the above embodiments, in the case where the number of the constituent element(s), the value, the amount, the range, and/or the like is specified, the present disclosure is not necessarily limited to the number of the constituent element(s), the value, the amount, and/or the like specified in the embodiment unless the number of the constituent element(s), the value, the amount, and/or the like is indicated as indispensable or is obviously indispensable in view of the principle of the present disclosure. Furthermore, a material, a shape, a positional relationship, or the like, if specified in the above-described example embodiments, is not necessarily limited to the specific material, shape, positional relationship, or the like unless it is specifically stated that the material, shape, positional relationship, or the like is necessarily the specific material, shape, positional relationship, or the like, or unless the material, shape, positional relationship, or the like is obviously necessary to be the specific material, shape, positional relationship, or the like in principle.

(Overview)

According to a first viewpoint shown in a part or all of the above embodiments, the heater device has the heat generating portion that is formed adjacent to one side of an insulating substrate and generates heat when energized. Further, the heater device has the heat equalizing portion that is provided between adjacent heat generating portions and that diffuses the heat of the heat generating portions in the surface direction of one surface. Further, the heat generating portion has a linear shape. At least one of the distance between one of adjacent heat generating portions and the heat equalizing portion and the distance between the other of adjacent heat generating portions and the heat equalizing portion is equal to or less than the line width Wh of the heat generating portion. Further, in the heat equalizing portion, the distance between one end of one of the adjacent heat generating portions and the other end of the other of the adjacent heat generating portions is longer than the line width of the heat generating portion.

Further, according to a second viewpoint, the heat equalizing portion and the heat generating portion are formed so that a length of a perpendicular line drawn from the heat equalizing portion to the heat generating portion has a constant length. According to this configuration, the heat of the heat generating portion can be evenly propagated to the heat equalizing portion.

Further, according to a third viewpoint, the heat equalizing portion has the first power line forming a linear shape and extending along one adjacent heat generating portion, and the second power line forming a linear shape and extending along the other adjacent heat generating portion.

Further, the heat equalizing portion has the heat dissipation part that dissipates the heat of the heat generating portion. The heat dissipation part is arranged between the first power line and the second power line, and is connected to either one of the first power line and the second power line.

Therefore, the heat equalizing portion can function as an electrode that forms an electric field for detecting an object.

Further, according to a fourth viewpoint, the heat equalizing portion has the first power line forming a linear shape and extending along one adjacent heat generating portion, and the second power line forming a linear shape and extending along the other adjacent heat generating portion. Further, the heat equalizing portion has a third power line arranged between the first power line and the second power line, and a heat dissipation part that is arranged between the first power line and the second power line, and is connected to either one of the first power line and the second power line so as to dissipate heat from the heat generation portion.

As a result, in addition to the electric lines of force going from the first power line to the third power line, the electric lines of force going from the second power line to the third power line are generated, so that the accuracy of the detection function can be improved.

Further, according to a fifth viewpoint, a fourth power line (261) connecting the first power line and the second power line is provided.

Therefore, the heat equalizing portion can be surrounded by the first power line and the second power line and the fourth power line so that the influence on the noise from the surroundings is further suppressed and it is possible to prevent malfunction.

Further, according to a sixth viewpoint, the heat dissipation part is arranged so as to straddle a center line connecting the centers of the heat generating portions, which is formed so that one end of the adjacent heat generating portion side and the other end of the adjacent heat generating portion side are adjacent to each other.

Therefore, the heat of the heat generating portion can be transferred to the portion farthest from the two adjacent heat generating portions, and the heat can be efficiently dissipated.

Further, according to a seventh viewpoint, the heat dissipation part has a first side connected to either one of the first power line and the second power line, and a second side facing the first side. Further, the length of the second side is longer than the length of the first side.

As a result, heat can be efficiently dissipated at a portion distant from the first power line extending along the heat generating portion. Further, heat can be efficiently dissipated at a portion distant from the second power line extending along the heat generating portion.

Further, according to an eighth viewpoint, a low thermal conductive section having a lower thermal conductivity than the heat dissipation part is formed inside the outer periphery of the heat dissipation part.

According to this configuration, the heat transfer in the heat dissipation part is suppressed by the low thermal conductive section, and when the object comes into contact with the heat dissipation part, the temperature of the contacted portion can be rapidly lowered.

Further, according to a ninth aspect, the heater device includes a plurality of heat dissipation portions. When a plurality of heat dissipation parts are projected from one of the adjacent heat generation portions to the other of the adjacent heat generation portions, the plurality of heat dissipation parts are formed so that the projection regions of the plurality of heat dissipation parts overlap each other. According to this configuration, it is possible to prevent the temperature of the adjacent heat dissipation parts from dropping.

What is claimed is:

1. A heater device, comprising:
a heat generating portion formed so as to be adjacent to one surface of an insulating substrate and configured to generate heat by energization; and
a heat equalizing portion provided between adjacent heat generating portions and configured to diffuse the heat of the heat generating portion in a surface direction of one surface, wherein
the heat generating portion has a linear shape,
at least one of a distance between one of the adjacent heat generating portions and the heat equalizing portion and a distance between the other of the adjacent heat generating portions and the heat equalizing portion is equal to or less than a line width of the heat generating portion,
in the heat equalizing portion, a distance between one end of one of the adjacent heat generating portions and the other end of the other of the adjacent heat generating portions is longer than the line width of the heat generating portion, and
the heat equalizing portion has a first power line having a linear shape and extending along one of the adjacent heat generating portions, and a second power line having a linear shape and extending along the other of the adjacent heat generating portions, and a heat dissipation part that is arranged between the first power line and the second power line and is connected to either one of the first power line or the second power line to dissipate heat from the heat generating portion.

2. The heater device according to claim 1, wherein the heat equalizing portion and the heat generating portion are formed so that a length of a perpendicular line drawn from the heat equalizing portion to the heat generating portion has a constant length.

3. The heater device according to claim 1, wherein a low thermal conductive section having a thermal conductivity lower than that of the heat dissipation part is formed inside an outer periphery of the heat dissipation part.

4. The heater device according to claim 1, wherein a plurality of the heat dissipation parts are provided, and the plurality of heat dissipation parts are arranged so as to straddle a center line connecting the centers of the heat generating portions, which is formed so that one end of the adjacent heat generating portion side and the other end of the adjacent heat generating portion side are adjacent to each other.

5. The heater device according to claim 1, wherein the plurality of heat dissipation parts include a first side connected to either one of the first power line and the second power line, and a second side facing the first side, and
a length of the second side is longer than a length of the first side.

6. The heater device according to claim 1, wherein a plurality of the heat dissipation parts are provided, and the plurality of heat dissipation parts are formed so that projection regions of the plurality of heat dissipation parts overlap each other, when a plurality of heat dissipation parts are projected from one of the adjacent heat generation portions to the other of the adjacent heat generation portions.

7. A heater device, comprising:
a heat generating portion formed so as to be adjacent to one surface of an insulating substrate and configured to generate heat by energization; and
a heat equalizing portion provided between adjacent heat generating portions and configured to diffuse the heat of the heat generating portion in a surface direction of one surface, wherein
the heat generating portion has a linear shape,
at least one of a distance between one of the adjacent heat generating portions and the heat equalizing portion and a distance between the other of the adjacent heat generating portions and the heat equalizing portion is equal to or less than a line width of the heat generating portion,
in the heat equalizing portion, a distance between one end of one of the adjacent heat generating portions and the other end of the other of the adjacent heat generating portions is longer than the line width of the heat generating portion, and
the heat equalizing portion has a first power line having a linear shape and extending along one of the adjacent heat generating portions, a second power line having a linear shape and extending along the other of the adjacent heat generating portions, a third power line arranged between the first power line and the second power line, and a heat dissipation part that is arranged between the first power line and the second power line and is connected to the third power line to dissipate heat from the heat generating portion.

8. The heater device according to claim 7, wherein the heat equalizing portion has a fourth power line connecting the first power line and the second power line.

9. The heater device according to claim 7, wherein the heat equalizing portion and the heat generating portion are formed so that a length of a perpendicular line drawn from the heat equalizing portion to the heat generating portion has a constant length.

10. The heater device according to claim 7, wherein a low thermal conductive section having a thermal conductivity lower than that of the heat dissipation part is formed inside an outer periphery of the heat dissipation part.

11. The heater device according to claim 7, wherein a plurality of the heat dissipation parts are provided, and the plurality of heat dissipation parts are arranged so as to straddle a center line connecting the centers of the heat generating portions, which is formed so that one end of the adjacent heat generating portion side and the other end of the adjacent heat generating portion side are adjacent to each other.

12. The heater device according to claim 7, wherein the plurality of heat dissipation parts include a first side connected to either one of the first power line and the second power line, and a second side facing the first side, and
a length of the second side is longer than a length of the first side.

13. The heater device according to claim 7, wherein a plurality of the heat dissipation parts are provided, and the plurality of heat dissipation parts are formed so that projection regions of the plurality of heat dissipation parts overlap each other, when a plurality of heat dissipation parts are projected from one of the adjacent heat generation portions to the other of the adjacent heat generation portions.

* * * * *